(No Model.)
A. H. HART.
LENS, SPECTACLES, OR EYEGLASS.
No. 573,087. Patented Dec. 15, 1896.
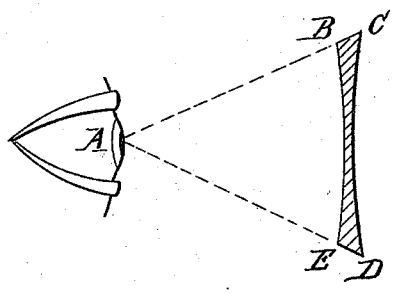
Fig:2.
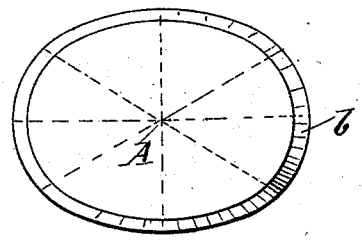
Fig:1.
Witnesses
N. W. Whitehead
Albert A. Newton
Andrew Henri Hart
Inventor
By Beno B. Gattell
Attorney

UNITED STATES PATENT OFFICE.

ANDREW HENRI HART, OF BROOKLYN, NEW YORK.

LENS, SPECTACLES, OR EYEGLASSES.

SPECIFICATION forming part of Letters Patent No. 573,087, dated December 15, 1896.

Application filed August 4, 1896. Serial No. 601,588. (No model.)

*To all whom it may concern:*

Be it known that I, ANDREW HENRI HART, a citizen of the United States, residing in the city of Brooklyn, in the county of Kings and State of New York, have invented a certain new and useful Improvement in Lenses, Spectacles, or Eyeglasses; and I do hereby declare that the following is a clear, full, and exact description of the invention, which will enable others skilled in the art to which it appertains to make the same.

Heretofore the rim of lenses, spectacles, or eyeglasses not covered by a frame has been simply ground in such a manner that the plane of grinding stood at an angle of ninety degrees or was rounded or stood at no particular angle at all to the surface of the lens. In consequence the eye of the person looking at objects through the lens or eyeglasses has thrown into it a streak of white light, caused by the reflection or refraction of light by the rim. Thereby a strain is caused upon the eye and the vision is impaired or disturbed, or both. The object of my invention is to obviate this reflection or refraction of light by the rim and to do away with said strain or disturbance by beveling the rim of the lens or eyeglass in such a manner that the eye, instead of seeing a streak or an expanse of light equal about to the breadth, length, and size of the rim of the lens or eyeglass or part of it, finds this reflection or refraction removed and obviated.

In the accompanying diagrams, illustrating the improvement and the mode of its attainment, Figure 1 represents a front view of the lens or one of the eyeglasses. *b* is the bevel around the rim of the same, and the glass thus forms a truncated cone, the apex of the cone being at A, representing the location of the eye of the spectator. In Fig. 2, BCDE represents a cross-section of the lens or eyeglass and at the same time a cross-section of the cone, the apex of which is in the eye of the spectator, (marked A in the diagram.) The surface ACD, bounded by lines ABC, AED, and CD, represents a section through the middle of the cone, of which my improved lens or eyeglass is the truncated base BCDE.

To carry my invention into effect, I bevel the rim of the lens or eyeglass. This bevel is made in such a way that the eyeglass forms a truncated cone, the apex of the cone being in the eye of the spectator, while its base is the outer surface of the lens or eyeglass. Thus the eye of the spectator sees, instead of the streak of reflected or refracted light, merely one line, the rim having been made into the surface of said truncated cone in such a manner that both of the lines of the rim, as well as the rim itself, coincide into a single line, so far as the spectator's eye is concerned.

I may bevel the lens or eyeglass either all the way around the rim or only partly around.

Having fully described my invention, what I desire to claim and secure by Letters Patent is—

A frameless lens or eyeglass having an edge partially or wholly beveled to form part of a truncated cone whose apex will be substantially at the eye of the wearer when the glass is in use.

ANDREW HENRI HART.

Witnesses:
 W. H. BARTLETT,
 A. H. WAITE.